Patented Apr. 2, 1935

1,996,065

UNITED STATES PATENT OFFICE 1,996,065

FUMIGANT

Joseph W. Dunning, Niagara Falls, N. Y., assignor to E. I. du Pont de Nemours & Company, Inc., Wilmington, Del., a corporation of Delaware No Drawing. Application May 18, 1932,
Serial No. 612,150

13 Claims. (Cl. 167—35)

This invention relates to a solid fumigant material and more particularly to a fumigant material which is capable of reacting with water to liberate hydrocyanic acid in toxic concentrations.

A common method of fumigating consists in reacting an alkali metal cyanide with acid at the point of fumigation to liberate hydrocyanic acid. This method is undesirable because of splattering or spilling of corrosive acid and the difficulty of handling acid residues. In many cases it is replaced by the more expensive method consisting in liberating liquid hydrocyanic acid at the point of fumigation. Liquid hydrocyanic acid is relatively dangerous and inconvenient to transport and handle and requires special equipment when used as a fumigant. It has been proposed to overcome these disadvantages by reacting together at the point of fumigation an alkali metal cyanide, water, and a salt having a relatively high heat of hydration, the base of which salt forms an unstable cyanide. As an example of this method, sodium cyanide and anhydrous aluminum sulfate may be reacted in the presence of water to liberate hydrocyanic acid, as shown in U. S. P. 1,497,690. The reaction probably occurs as follows:

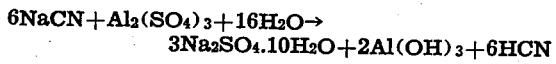
$$6NaCN + Al_2(SO_4)_3 + 16H_2O \rightarrow \\ 3Na_2SO_4.10H_2O + 2Al(OH)_3 + 6HCN$$

I now have discovered that this process of generation of HCN from NaCN can be improved. When operating this method I have found a tendency to excessive foaming of the reactants. Further, the caked residue is hard and tough, making it difficult to remove. This tendency of the residue to harden also delays the reaction and often prevents complete reaction so that relatively large amounts of cyanide may remain in the residue, and prevents the escape of all the hydrocyanic acid formed.

The object of this invention is to provide a method of, and a composition of matter for generating hydrocyanic acid, wherein suitable substances are reacted with water to generate hydrocyanic acid in toxic concentrations without undue foaming and leaving a substantially dry, porous, friable residue, which is easily removed from the reaction container. A further object is to provide such a method in which a cyanide is substantially completely reacted to form hydrocyanic acid which is substantially completely evolved from the mixture.

These objects may be accomplished by mixing together water, metal cyanide, one or more salts having relatively high heats of hydration and whose bases form unstable cyanides (hereinafter called "generating salts"), materials which inhibit foaming of the reaction and a material which is inert to the cyanide reaction but reacts with water to form a substantially dry, solid, relatively insoluble substance.

I have discovered that when hydrocyanic acid is generated by adding water to alkali metal cyanide or other metal cyanide and a "generating salt", i. e., a salt whose base forms an unstable cyanide, in the presence of certain materials hereinafter termed "residue conditioners", the residue formed is substantially dry, porous, and friable, and may be easily removed from the reaction container. These "residue conditioners" are substances which react with water to form solid, relatively insoluble substances and, surprisingly enough, are often materials which, when treated alone with water, form hard, coherent masses. For instance, I have found Portland cement and plaster of Paris to be suitable for this purpose. Unslaked lime (CaO) is also suitable as residue conditioner. By use of these residue conditioners, the reaction may be made substantially complete, since they allow the use of substantial excess of water while still permitting the formation of a substantially dry residue. They preferably are used in amounts sufficient to react with the excess water used, or in greater proportions. I have obtained good results by adding the residue conditioner in amounts from 2% to 20% of the total weight of the non-aqueous reacting materials. It has been proposed to add salts and water to such mixtures in such ratios that substantially all of the water will finally appear as water of crystallization of the salts added and/or formed. This method, however, does not produce the porous, friable residue obtained by my invention.

The porous nature of the residue produced by my method contributes materially to the friability and consequent ease of removal of the residue. By properly apportioning the amount of foam inhibitor described herein, that amount of foaming may be obtained which will give the degree of porosity desired. The formation of the porosity is probably caused by a partial "setting" or hardening due to the presence of the residue conditioner, which action tends to entrap gas or vapor to form the porous structures. Whether or not this explanation be correct, I have observed that when the residue conditioner employed is an inert material incapable of taking up water to form insoluble hydrates, the residue is substantially non-porous or at best has a very low degree of porosity and is more difficult to remove than when the herein described residue conditioners are employed.

I have further discovered that certain substances when present in the reaction mixture greatly inhibit foaming. A great number of substances have heretofore been used for the prevention of foaming in chemical reactions but many of them do not prevent foaming in the herein described cyanide reaction. I have found that foaming of this reaction may be inhibited by the addition of small amounts of a liquid hydrocarbon, for instance kerosene or a light lubricating oil, or by a lower alcohol, for instance, methanol, isopropyl alcohol, normal butyl alcohol, or amyl alcohol. The foam inhibitor may be added to the solid reactants before reacting with water, or it may be added simultaneously with the water at the time of reaction. If an alcohol is used as foam inhibitor, it conveniently may be dissolved in the water used for the reaction. In most cases I have found 1% to 2% of the foam inhibitor sufficient to prevent undue foaming. My invention, however, is not limited to these proportions; larger amounts may be used if it is desired further to reduce foaming. It is preferable, however, not to use so much foam inhibitor that it will materially change the physical characteristics of the solid ingredients by wetting.

The herein described residue conditioners also inhibit foaming of the reaction to some extent, so that it may be practicable in some cases to omit the liquid foam inhibitors. However, I prefer to use both liquid foam inhibitor and residue conditioner as herein described.

To generate hydrocyanic acid according to my invention, a metal cyanide, a salt whose base forms an unstable cyanide, and a residue conditioner, with or without a foam inhibitor as herein described, are simultaneously treated with water in any convenient manner. I prefer first to prepare a pulverant mixture of the non-aqueous ingredients and treat the mixture with water. The residue conditioner present permits the use of a substantial excess of water over that required by the reaction and I prefer to add about three times the amount of water required to react with the cyanide and the generating salt. With this excess of water, the proper amounts of residue conditioner and excess of generating salt are used to produce a soft, friable residue, as described below. The excess of water causes the reaction to be substantially complete and also compensates for the loss of some water which escapes as vapor. Furthermore, it is preferable to so adjust the relative amounts of excess water, residue conditioner and excess generating salt that the resulting residue will be slightly moist, since a residue containing no free water is more difficult to remove from the reaction container, although it is superior in this respect to the hard residues produced by prior methods. The optimum proportion of water may be estimated by calculation and more exactly determined by trial.

The "generating salt" is preferably one which also has a relatively high heat of hydration and is preferably used in its anhydrous form. Sulphates and chlorides of aluminum and magnesium are examples of salts especially suitable for this purpose. Dehydrated aluminum sulfate suitable for use in my invention may be made from the ordinary hydrated salt by heating the salt in a vacuum pan dryer until about half the water is removed and then completing the dehydration by heating in shallow pans open to the atmosphere. The vacuum pan dryer is preferably operated with a shelf temperature of about 110° C. and under a vacuum of about 28 inches of mercury less than atmospheric pressure.

I prefer to use an excess of 25-50% of the "generating salt" over that required to react with the cyanide, in order to insure substantially complete HCN evolution. If smaller quantities are used, the reaction tends to be incomplete; there is little or no practical advantage in using more than a 50% excess of the generating salt.

In order to obtain the maximum generation of hydrocyanic acid, the water is preferably added as rapidly as possible to the pulverant mass, so as to obtain some agitation by the action of the stream of water entering the reaction container. Practically any water-tight container may be used as reaction vessel; for instance, I have found an ordinary galvanized iron can of several gallons capacity suitable for this purpose.

*Example*

A pulverant mixture is made having the following composition:

| | Per cent |
|---|---|
| Anhydrous aluminum sulphate | 58.7 |
| Sodium cyanide | 34.8 |
| Portland cement | 4.7 |
| Kerosene | 1.9 |

A quantity of this mixture is placed in a suitable container and 0.9-1.0 liter of water is added for each kilogram of the mixture. The water is poured rapidly into the mixture by allowing it to run down one side of the container. The evolution of hydrocyanic acid is rapid, being substantially complete in about 30 minutes, but causes only slight foaming. When the reaction is complete, a moist, porous, friable residue remains which may be easily removed from the container by simply inverting the same. The residue contains less than 1% of cyanide or hydrocyanic acid.

Although, for the purpose of illustrating my invention I have given an example wherein sodium cyanide is used as the source of hydrocyanic acid, it is understood that other metal cyanides also may be used. For instance, I have found that the sodium cyanide may be replaced by calcium cyanide with good results.

Pulverant mixtures may be made according to my invention which are sufficiently reactive to liberate hydrocyanic acid in toxic concentrations when brought into contact with the moisture of the air. Hence, it is possible to use such mixtures as fumigants by simply spreading them out in thin layers in the place it is desired to fumigate. When my fumigant is to be used this way it is preferable that the generating salt be one which has a relatively high heat of hydration, is in its anhydrous form, and is more or less deliquiscent. For this type of fumigation the foam inhibitor may be omitted if desired. I have found that a mixture containing anhydrous aluminum sulphate, as illustrated in the example, is suitable for this kind of fumigation.

The generation of hydrocyanic acid according to my invention is less expensive, less hazardous, and more convenient than the use of liquid hydrocyanic acid. It does not employ acid or other corrosive materials and hence causes no damage to premises to be fumigated and does not require acid resistant equipment. The residue remaining is substantially non-toxic, non-corrosive, and is easily removed from the reaction containers and otherwise handled.

I claim:

1. A process for the generation of hydrocyanic acid comprising mixing together water, metal cyanide, a metal salt the base of which forms an unstable cyanide and a substance capable of taking up water to form a solid, relatively insoluble hydrate.

2. A process for the generation of hydrocyanic acid comprising mixing together water, metal cyanide, a metal salt the base of which forms an unstable cyanide, a substance capable of taking up water to form a solid, relatively insoluble hydrate, and a foam inhibitor comprising a substance selected from the group consisting of liquid hydrocarbons and lower aliphatic alcohols.

3. A process for the generation of hydrocyanic acid comprising mixing together water, alkali metal cyanide, a metal salt having a relatively high heat of hydration, the base of which forms an unstable cyanide and a substance capable of taking up water to form a solid, relatively insoluble hydrate.

4. A process for the generation of hydrocyanic acid comprising mixing together water, sodium cyanide, anhydrous aluminum sulphate, a liquid hydrocarbon and a substance capable of taking up water to form a solid, relatively insoluble hydrate.

5. A process for the generation of hydrocyanic acid comprising exposing to atmospheric moisture a mixture comprising sodium cyanide, anhydrous aluminum sulphate and a substance capable of taking up water to form a solid, relatively insoluble hydrate.

6. A composition of matter comprising alkali metal cyanide, a metal salt the base of which forms an unstable cyanide and a substance capable of taking up water to form a solid, relatively insoluble hydrate.

7. A composition of matter comprising alkali metal cyanide, a metal salt the base of which forms an unstable cyanide, a foam inhibitor comprising a substance selected from the group consisting of liquid hydrocarbons and lower aliphatic alcohols and a substance capable of taking up water to form a solid, relatively insoluble hydrate.

8. A composition of matter comprising a pulverant mixture of alkali metal cyanide, a metal salt having a relatively high heat of hydration, the base of which forms an unstable cyanide, a liquid hydrocarbon, and Portland cement.

9. A composition of matter comprising a pulverant mixture of alkali metal cyanide, anhydrous aluminum sulphate, a foam inhibitor comprising a substance selected from the group consisting of liquid hydrocarbons and lower aliphatic alcohols and a substance capable of taking up water to form a solid, relatively insoluble hydrate.

10. A composition of matter comprising a pulverant mixture of alkali metal cyanide, anhydrous aluminum sulphate, a liquid hydrocarbon and Portland cement.

11. A composition of matter comprising a pulverant mixture of sodium cyanide, anhydrous aluminum sulphate in an amount 25–50% in excess of that required to react with said cyanide, 1–2% by weight of kerosene, and Portland cement.

12. A composition of matter comprising a pulverant mixture of sodium cyanide, anhydrous aluminum sulphate, 1–2% by weight of a lower alcohol, and Portland cement.

13. A composition of matter comprising metal cyanide, a metal salt the base of which forms an unstable cyanide and a substance capable of taking up water to form a solid, relatively insoluble hydrate.

JOSEPH W. DUNNING.